US010081283B2

United States Patent
Jayasuriya et al.

(10) Patent No.: US 10,081,283 B2
(45) Date of Patent: Sep. 25, 2018

(54) ARMREST FOR A VEHICLE (71) Applicant: FORD GLOBAL TECHNOLOGIES, LLC, Dearborn, MI (US)

(72) Inventors: Mangala A. Jayasuriya, Bloomfield Hills, MI (US); Linh Doan, Belleville, MI (US); Bhavani Thota, Novi, MI (US); Amit Chakravarty, Warren, MI (US); Robert William McCoy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 48 days.

(21) Appl. No.: 15/437,574

(22) Filed: Feb. 21, 2017

(65) Prior Publication Data

US 2018/0236908 A1     Aug. 23, 2018

(51) Int. Cl.
| | |
|---|---|
| *B60J 9/00* | (2006.01) |
| *B60N 2/75* | (2018.01) |
| *B60N 2/46* | (2006.01) |

(52) U.S. Cl.
CPC ............... *B60N 2/78* (2018.02); *B60N 2/466* (2013.01)

(58) Field of Classification Search
CPC .................................. B60N 2/78; B60N 2/446
See application file for complete search history.

(56) References Cited

U.S. PATENT DOCUMENTS

| 6,695,387 | B1 * | 2/2004 | Gordon | B60N 2/787 |
|---|---|---|---|---|
| | | | | 296/153 |
| 7,070,221 | B2 | 7/2006 | Cowelchuk et al. | |
| 7,226,113 | B2 | 6/2007 | Dreier et al. | |
| 7,681,939 | B2 | 3/2010 | Augustyn | |
| 7,828,388 | B2 | 11/2010 | Thomas | |
| 9,925,897 | B2 * | 3/2018 | Doan | B29C 45/14336 |
| 2015/0165943 | A1 * | 6/2015 | Doan | B60R 13/0243 |
| | | | | 297/411.21 |
| 2018/0111578 | A1 * | 4/2018 | Bozio | B60N 2/46 |

* cited by examiner

*Primary Examiner* — Lori L Lyjak
(74) *Attorney, Agent, or Firm* — Vichit Chea; Brooks Kushman, P.C.

(57) ABSTRACT

A vehicle armrest includes a unitary frame defining a horizontal portion having a thinner pliable body and a thicker stiffer perimeter surrounding the body, and first and second vertical portions extending in opposite directions from ends of the horizontal portion. The first vertical portion abuts an inner doorframe, and the horizontal and first vertical portions define a cavity configured to retain a cushion over the body. The vehicle armrest further includes a cover layer over the cushion and frame.

20 Claims, 9 Drawing Sheets

ARMREST FOR A VEHICLE

TECHNICAL FIELD

The present disclosure relates to armrests for motor vehicles.

BACKGROUND

Motor vehicles may include armrests in the door or elsewhere in the interior. It may be desirable for the armrests to be designed such that they are collapsible upon impact. It may also be desirable for the armrests to be designed such that they are able to support a vertical load from, for example, an occupant's arm.

SUMMARY

According to an embodiment, a vehicle armrest includes a unitary frame defining a horizontal portion having a thinner pliable body and a thicker stiffer perimeter surrounding the body, and first and second vertical portions extending in opposite directions from ends of the horizontal portion. The first vertical portion abuts an inner doorframe, and the horizontal and first vertical portions define a cavity configured to retain a cushion over the body. The vehicle armrest further includes a cover layer over the cushion and frame.

According to another embodiment, a vehicle armrest includes a frame defining a horizontal portion having a thinner pliable body and first and second thicker ends bounding the body, and first and second vertical portions coupled to and extending in opposite directions from the horizontal portion. The first vertical portion abutting a doorframe, and the horizontal and first vertical portions define a cavity for retaining a cushion over the body. The vehicle armrest further includes a cover layer over the cushion and frame.

According to another embodiment, a vehicle armrest includes a one-piece frame defining a horizontal portion with a generally planar top surface defined by a thinner body and a thicker perimeter bounding the body, and first and second vertical portions extending in opposite directions from opposing lateral ends of the horizontal portion. The first vertical portion abuts the top surface, and the horizontal and first vertical portions define a cavity for retaining a cushion over the body and perimeter.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
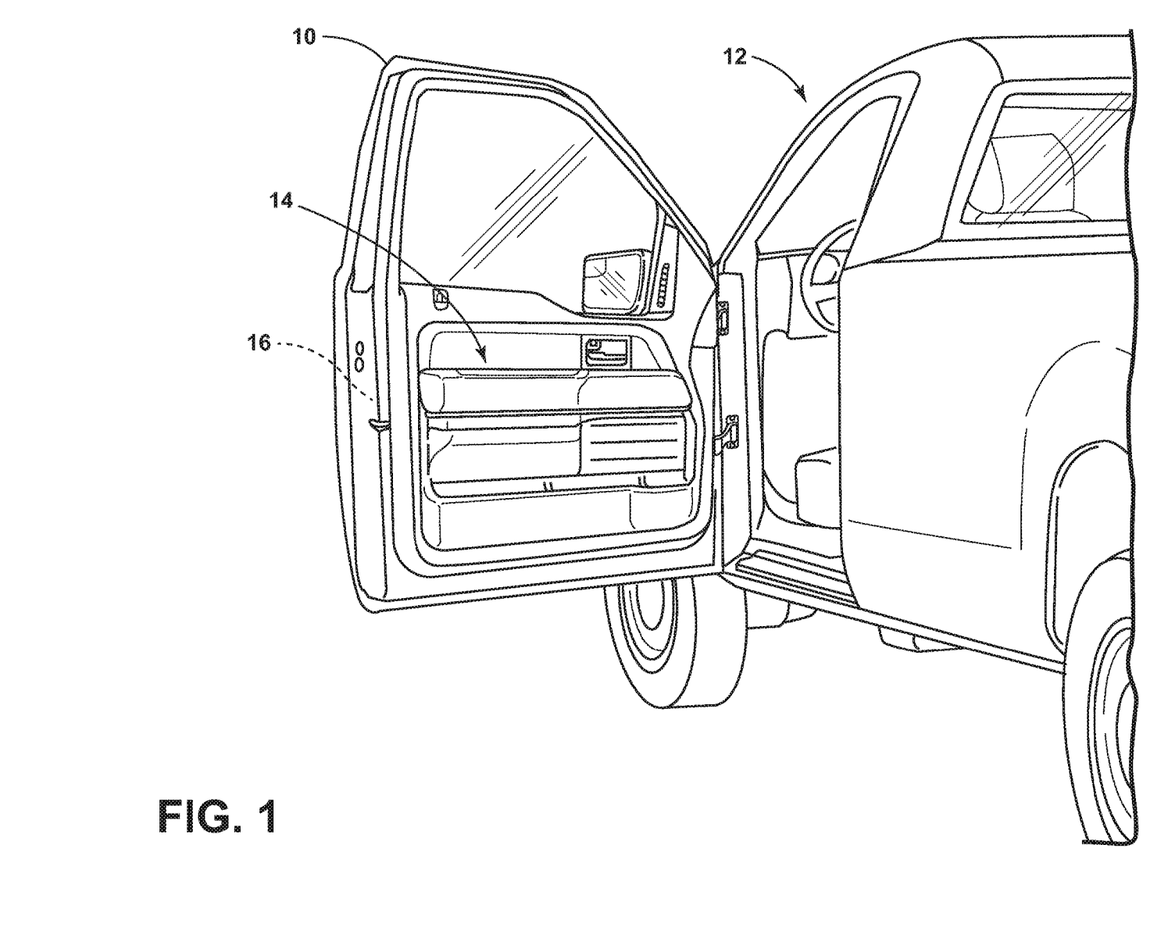
FIG. 1 is a perspective view of an interior of a door of a vehicle showing an armrest coupled to the door in accordance with embodiments of the instant disclosure.

FIG. 1 is a perspective view of an interior of a door 10 of a vehicle 12 showing an armrest 14 coupled to the door 10. The door 10 includes a doorframe 16 to which other components are attached. In the illustrated embodiment, the armrest 14 is coupled to the doorframe 16 to support a vertical load from an arm of an occupant of the vehicle 12. Although in the illustrated embodiment the armrest 14 is coupled to the door 10, the armrest 14 may be disposed in other areas of the vehicle 12 and/or attached to other vehicular components. For example and without limitation, the armrest 14 may be positioned in a side panel without a door or in a center console.

Figure 2:
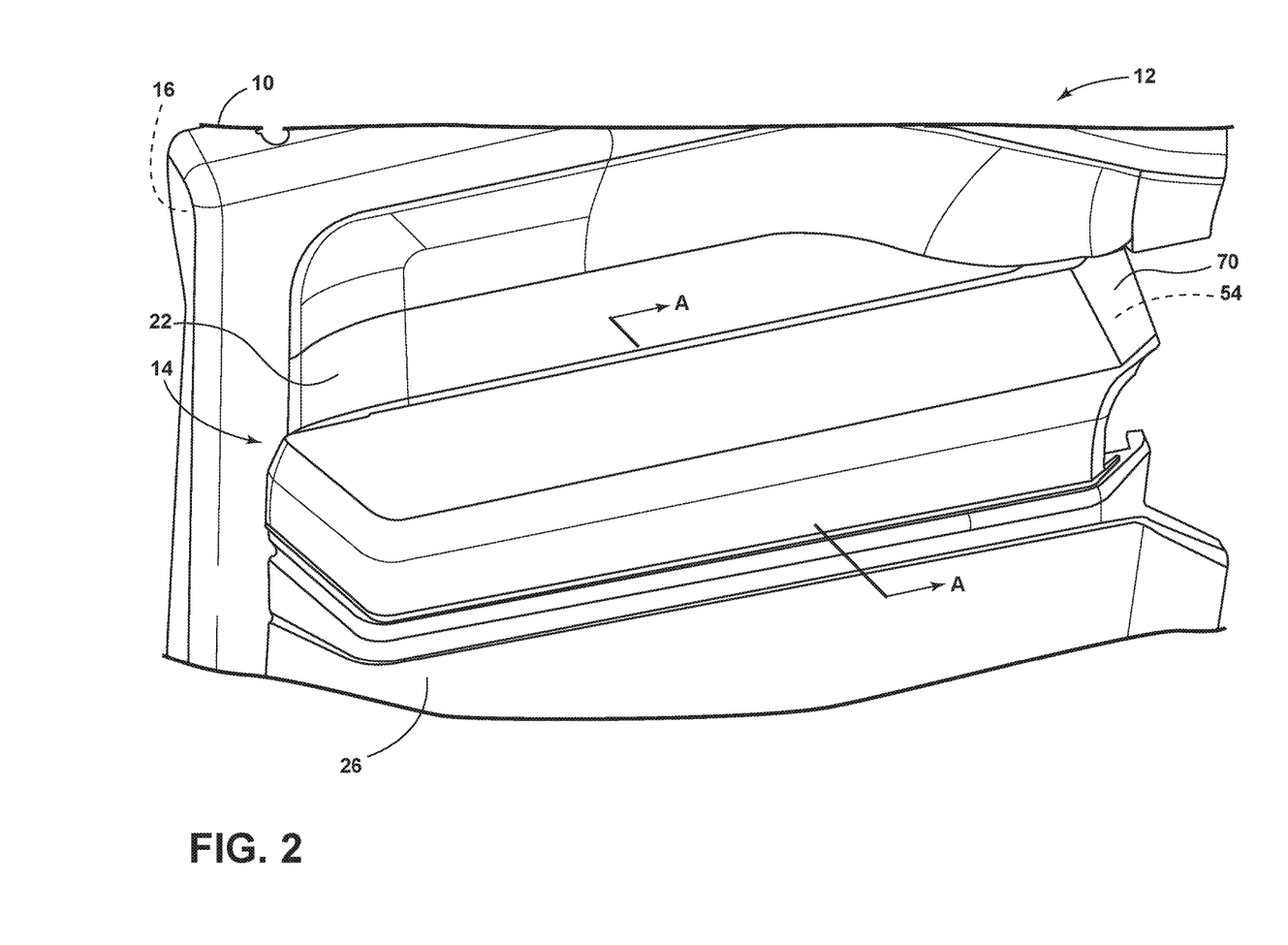
FIG. 2 is a close-up perspective view of the armrest illustrated in FIG. 1.
Figure 3:
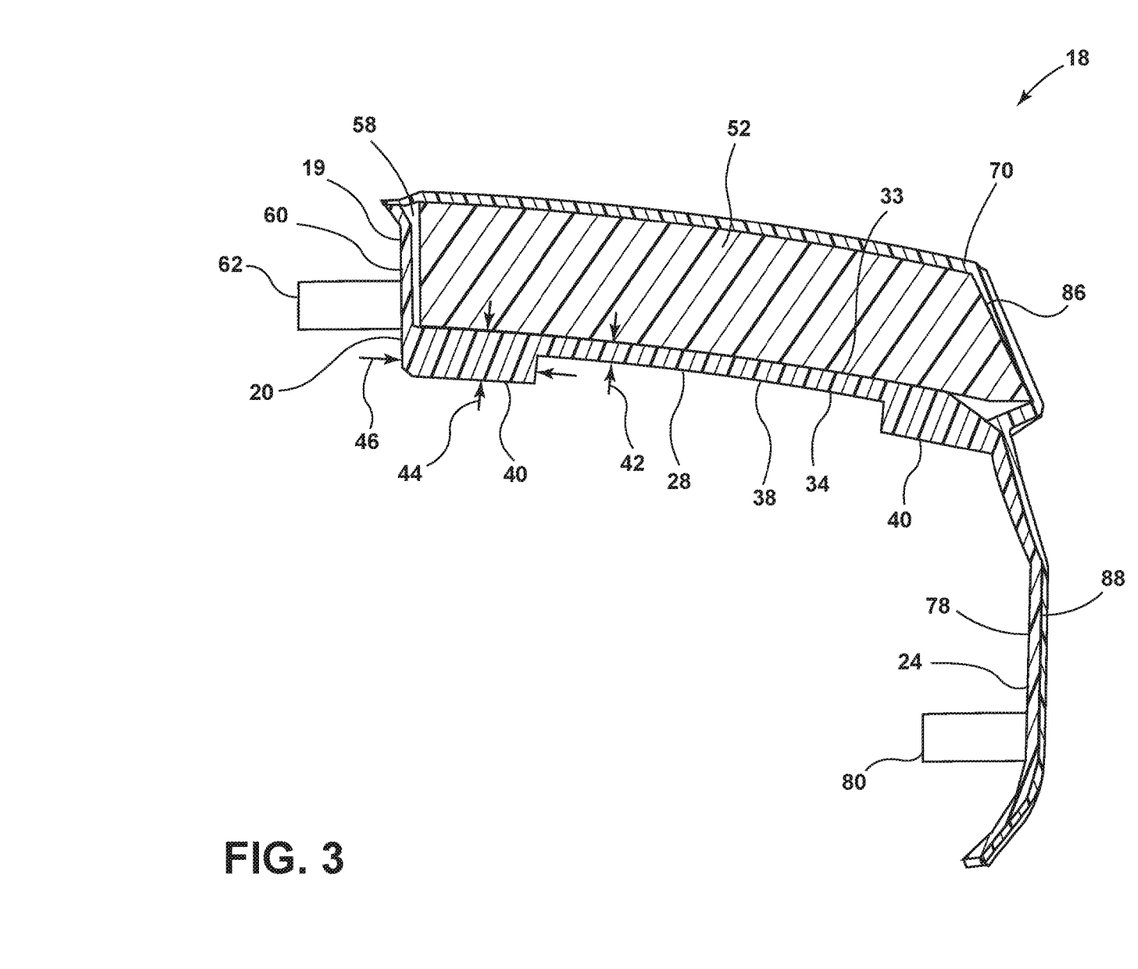
FIG. 3 is cross-sectional view of an armrest taken along line A-A of FIG. 2 in accordance with one embodiment of the instant disclosure.
Figure 4:
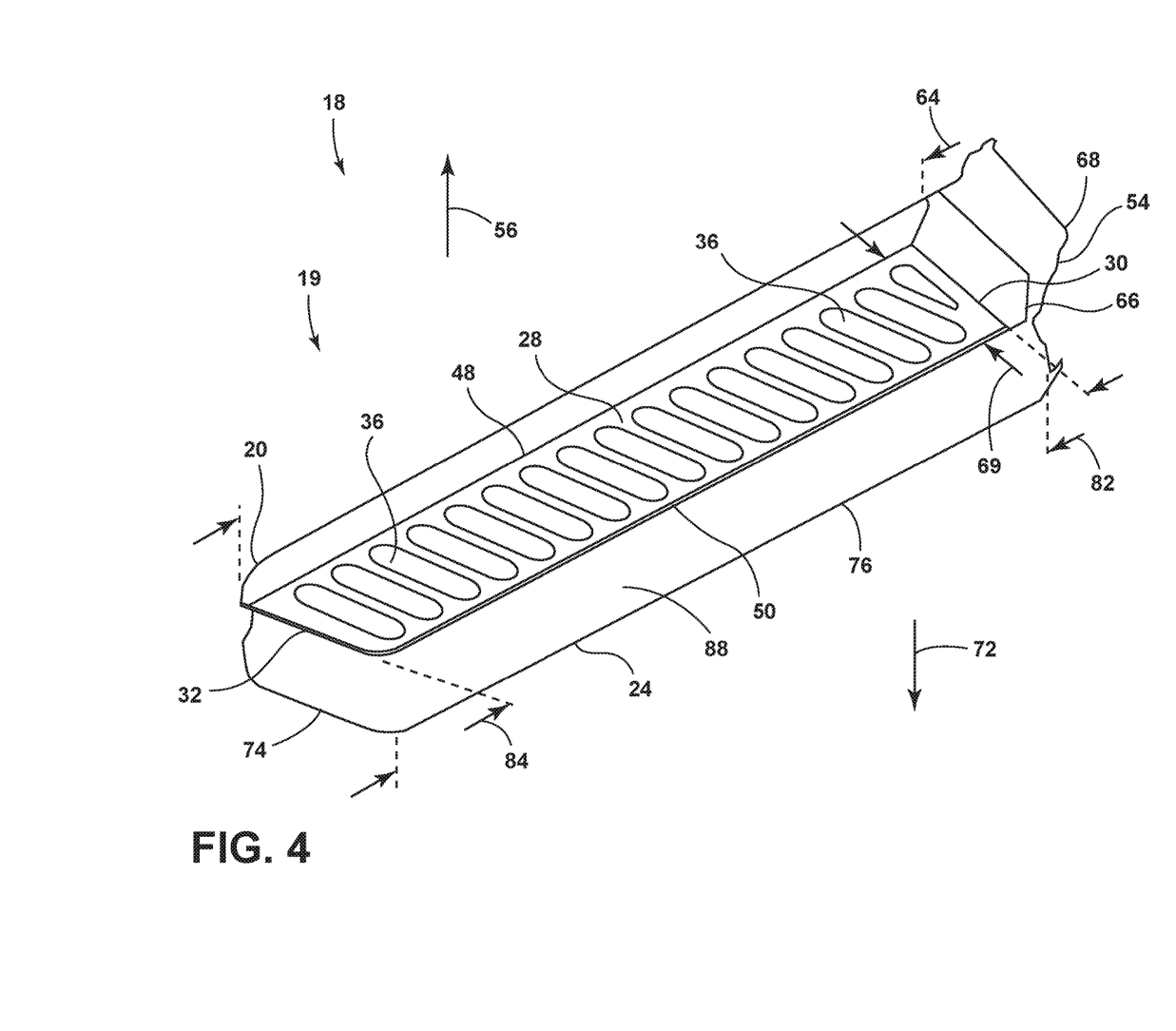
FIG. 4 is a perspective view of the armrest of FIG. 3 with the cushion and cover layer removed.

FIG. 2 is a close-up perspective view of the armrest 14 illustrated in FIG. 1. FIG. 3 is cross-sectional view of an armrest 18 taken along line A-A of FIG. 2 in accordance with one embodiment of the instant disclosure. FIG. 4 is a perspective view of the armrest 18 of FIG. 3 with the cushion and cover layer removed. In the illustrated embodiment, the armrest 18 includes a frame 19 to serve as a main support structure for the armrest 18. The frame 19 has a vertical portion 20 abutting an upper portion 22 of the doorframe 16 and a vertical portion 24 attached to a lower portion 26 of the door 10. In one embodiment, the doorframe 16 includes inner and outer sheets of metal, for example, and the vertical portion 20 of the frame 19 is coupled to and abuts the inner sheet of the doorframe 16 (i.e., an inner doorframe). Furthermore, in one embodiment, the vertical portion 24 is attached to a trim panel of the door 10. The frame 19 is generally fixed.

In the illustrated embodiment of FIGS. 3-4, the frame 19 is unitary and one-piece and defines a horizontal portion 28. The horizontal portion 28 protrudes into the interior of the vehicle 12 to support a vertical load such as from an arm of an occupant of the vehicle 12. The horizontal portion 28 may be positioned such that it accommodates a height of the occupant's elbow, for example. In the illustrated embodiment, the horizontal portion 28 is the central body from which other armrest elements extend or are disposed. The horizontal portion 28 is generally rectangular in shape and having longitudinal ends 30, 32. The horizontal portion 28 may also have a plurality of apertures 36 extending therethrough to decrease weight and improve lateral collapsibility upon impact while still maintaining sufficient structural support to withstand the vertical load. The apertures 36 may be spaced between the longitudinal ends 30, 32 and extending from a top surface 33 to a bottom surface 34 of the horizontal portion 28. In other embodiments, the apertures 36 may instead be recesses formed in the top surface 33 and/or bottom surface 34, for example. The apertures 36 may be uniform or non-uniform in shape and/or size. In the illustrated embodiment, a majority of the apertures 36 are oval in shape. In other embodiments, the apertures 36 may be circular, square, triangular, or honeycomb in shape, for example.

With reference to FIG. 3, the horizontal portion 28 has a thinner pliable body 38 and a thicker stiffer perimeter 40 surrounding the body 38 to decrease weight of the horizontal portion 28 and improve lateral collapsibility of the armrest 18 upon impact while maintaining structural support of the armrest 18 to support the vertical load. The body 38 is generally rectangular in shape and centrally disposed, and the perimeter 40 extends outwardly from the body 38. The apertures 36 may extend through the body 38. In some embodiments, a thickness 42 of the body 38 is 1-2 mm, and a thickness 44 of the perimeter 40 is 3-4 mm. In one embodiment, the thickness 42 is less than 2.5 mm, and the thickness 44 of the perimeter 40 is greater than 2.5 mm. A majority of the perimeter 40 has a uniform width 46 measured from the body 38. In one embodiment, the width 46 is at least 10 mm. Although the perimeter 40 has a uniform width 46 around the body 38, one of ordinary skill in the art will understand that the perimeter 40 may have a non-uniform width 46 around the body 38. Furthermore, although the perimeter 40 is illustrated as having a uniform thickness 44 around the body 38, the perimeter 40 may have a non-uniform thickness 44 around the body 38. For example and without limitation, some portions of the perimeter 40 may have a thickness 44 equal to the thickness 42 of the body 38. With reference to FIGS. 3-4, in one embodiment, ends 48, 50 bounding the body 38 may be thicker than the body 38, and longitudinal ends 30, 32 may have the same thickness as the body 38.

With reference to FIG. 3, the horizontal portion 28 of the frame 19 has a generally planar top support surface 33 defined by the thinner body 38 and thicker perimeter 40. The top surface 33 is in direct contact with a cushion 52 of the armrest 18 in the illustrated embodiment. The top surface 33 also extends between the vertical portions 20, 54.

The frame 19 further includes vertical portions 20, 24, and 54. As discussed above, the vertical portion 20 abuts the inner sheet of the door 10 and is used to couple the armrest 18 to the door 10. The vertical portion 20 extends in an upwards direction 56 from the end 48 of the horizontal portion 28. The vertical portion 20 extends a length 84 of the horizontal portion 28. The vertical portion 20 also partially defines a cavity 58 configured to retain the cushion 52 over the body 38. In the illustrated embodiment, the vertical portion 20 is disposed perpendicularly relative to the top surface 33 of the horizontal portion 28. The vertical portion 20 has a surface 60 opposite the cushion 52 from which a plurality of bushings 62 protrude. The bushings 62 are spaced along a length 64 of the vertical portion 20 and are used to couple the armrest 18 to the door 10 of the vehicle 12. The bushings 62 extend through apertures in the inner sheet of the doorframe 16. One of ordinary skill in the art will understand that there are numerous ways to couple the armrest 18 to the door 10 with or without the use of the bushings 62.

The vertical portion 20 is coupled to the vertical portion 54. In the illustrated embodiment, the vertical portion 54 extends from a front side (longitudinal end 30) of the horizontal portion 28. The vertical portion 54 has two segments 66, 68. The segment 66 of the vertical portion 54 extends at a right angle relative to the vertical portion 20 and relative to the horizontal portion 28. The segment 66 extends a width 69 of the horizontal portion 28 and is the same height as the vertical portion 20. The segment 66 also partially defines the cavity 58 configured to retain the cushion 52 over the body 38. The segment 68 of the vertical portion 54 extends outwardly and upwardly from the segment 66. The segments 66, 68 are used to give contour to the front of the armrest 18. As seen in FIG. 2, a cover layer 70 is disposed over the vertical portion 54 as well. Depending on the application, the vertical portion 54 may take on a variety of different shapes and sizes.

With reference to FIGS. 3-4 the armrest 18 also includes the vertical portion 24. The vertical portion 24 abuts a trim panel of the door 10 and is used to couple the armrest 18 to the door 10 and to give shape to the lower portion of the armrest 18 below the horizontal portion 28. The vertical portion 24 extends in a downwards direction 72 from the ends 32, 50 of the horizontal portion 28. As such, the vertical portion 24 is generally L-shaped and having segments 74, 76. The corner coupling segments 74, 76 may be rounded. The segments 74, 76 are generally disposed perpendicularly relative to the top surface 33 of the horizontal portion 28. The height of the segments 74, 76 measured from the top surface 33 of the horizontal portion 28 is greater than the height of the vertical portions 20, 54. The segment 76 of the vertical portion 24 has an interior surface 78 underneath the horizontal portion 28 from which a plurality of bushings 80 protrude. The bushings 80 are spaced along a length 82 of the vertical portion 24 and are used to couple the armrest 18 to the door 10 of the vehicle 12. The bushings 80 extend through apertures in the trim panel of the door 10. One of ordinary skill in the art will understand that there are numerous ways to couple the armrest 18 to the door 10 with or without the use of the bushings 80.

In the illustrated embodiment of FIG. 4, the frame 19 is a unitary, one-piece frame. The frame 19 may be injection molded and comprise one material, such as a thermoplastic elastomer. Making the frame 19 as a unitary, one-piece component may decrease manufacturing costs. In one embodiment, the frame 19 comprises the thermoplastic elastomer known as Hytrel® (e.g., 6356 or 8238), commercially available from E. I. du Pont de Nemours and Company. The thermoplastic elastomer may have a percent elongation (at break) greater than 100%. In one embodiment, the thermoplastic elastomer has a percent elongation greater than 300%. Percent elongation as used herein can be determined according to ISO standard 527-1/-2. In another embodiment, the frame 19 may comprise a thermoplastic polymer such as Acrylonitrile butadiene styrene (ABS). ABS may have a percent elongation (at break) of less than 100%. In one embodiment, the thermoplastic polymer (such as ABS) has a percent elongation (at break) in the range of 5% to 25%.

With reference to FIGS. 3-4, the cushion 52 of the armrest 18 is disposed on the top surface 33 of the horizontal portion 28. In the illustrated embodiment, there is a small gap between the vertical portion 20 and the cushion 52. In some embodiments, the cushion 52 abuts the vertical portions 20, 54. The cushion 52 is provided for comfort and extends a length 84 and width 69 of the horizontal portion 28. A height of the cushion 52 is generally the same as the height of the vertical portion 20. As illustrated, an end 86 of the cushion 52 may be beveled. The cushion 52 may be a foam-material and/or comprise polyurethane or the like.

With continued reference to FIG. 4, the armrest 18 includes the cover layer 70 disposed over the cushion 52 and frame 19. The cover layer 70 serves as the outer layer of the armrest 18. The cover layer 70 is tightly form-fitted over the cushion 52 and frame 19 for aesthetic purposes and to aid in fixing the cushion 52 to the frame 19. An adhesive layer may be used at a bottom surface of the cushion 52 in contact with the horizontal portion 28 to secure the cushion 52 to the top surface 33 of the horizontal portion 28. The cover layer 70 may be disposed on top of the vertical portions 20, 54 and on an exterior surface 88 of the vertical portion 24. The cover layer 70 may comprise leather, vinyl, or the like.

Figure 5:
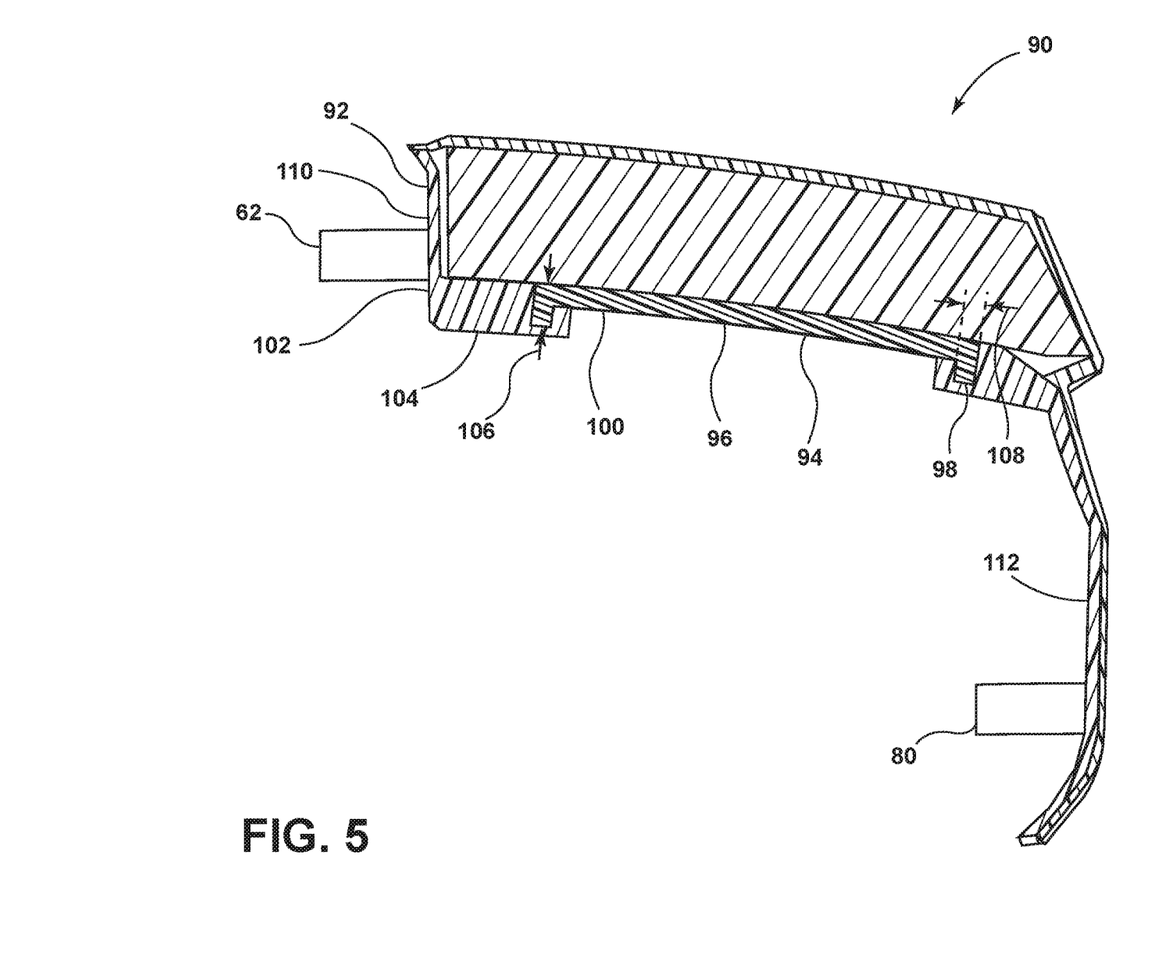
FIG. 5 is cross-sectional view of an armrest taken along line A-A of FIG. 2 in accordance with another embodiment of the instant disclosure.

FIG. 5 is cross-sectional view of an armrest 90 taken along line A-A of FIG. 2 in accordance with another embodiment of the instant disclosure. The armrest 90 of FIG. 5 is similar to the armrest 18 of FIGS. 3-4 and can be used in the vehicle 12 of FIG. 1 as armrest 14 as well. The armrest 90 includes a unitary, one-piece frame 92 that has the same shape and appearance as the frame 19 of the armrest 18 shown in FIG. 4. The frame 92 of the armrest 90 illustrated in FIG. 5, however, comprises two materials. The difference between the frame 19 and the frame 92 will now be discussed in detail.

In the illustrated embodiment of FIG. 5, the frame 92 includes a central portion 94. The central portion 94 has a thinner center 96 surrounded by a thicker boundary 98. The thinner center 96 is generally rectangular in shape and serves as the thinner pliable body 100 of a horizontal portion 102 of the frame 92. The thinner center 96 of the central portion 94 also extends into a thicker stiffer perimeter 104 of the horizontal portion 102. The thicker boundary 98 may have a uniform thickness 106 of 2.5 mm and a uniform width 108 of 1-2 mm around the entire center. In one embodiment, the thickness 106 is at least 2.5 mm. The thicker boundary 98 can be continuous or with openings. One of ordinary skill in the art will understand that the central portion 94 can have a number of shapes and sizes. For example and without limitation, the central portion 94 can be narrower in width or, alternatively, comprise the entire horizontal portion 28 with vertical portions 110, 112 extending in opposite directions therefrom.

In one embodiment, the central portion 94 comprises a thermoplastic elastomer having a percent elongation (at break) of more than 100%. In one particular embodiment, the percent elongation is greater than 300%. A thermoplastic elastomer such as Hytrel®, as discussed above, may be utilized as the thermoplastic elastomer of the central portion 94. The central portion 94 can be injection molded first and then placed in another mold as the rest of the frame 92 is injection molded as well. In one embodiment, the thicker stiffer perimeter 104 surrounding the central portion 94 along with the vertical portions 110, 112 comprise a thermoplastic polymer having a percent elongation (at break) less than 100%, such as ABS. In one embodiment, the thermoplastic polymer, such as ABS, has a percent elongation (at break) in the range of 5% to 25%.

Figure 6:
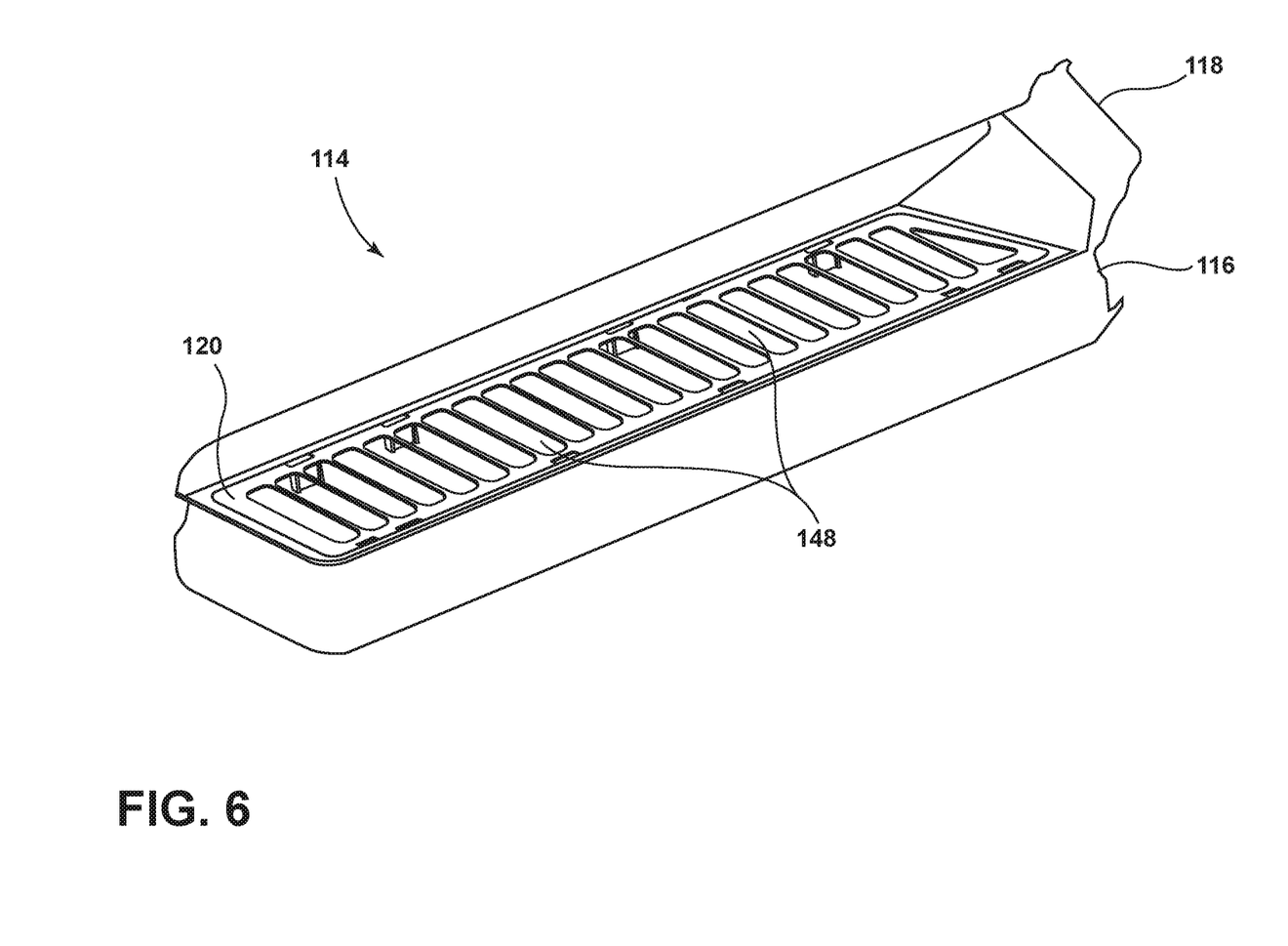
FIG. 6 is a perspective view of an armrest with the cushion and cover layer removed in accordance with another embodiment of the instant disclosure.
Figure 7:
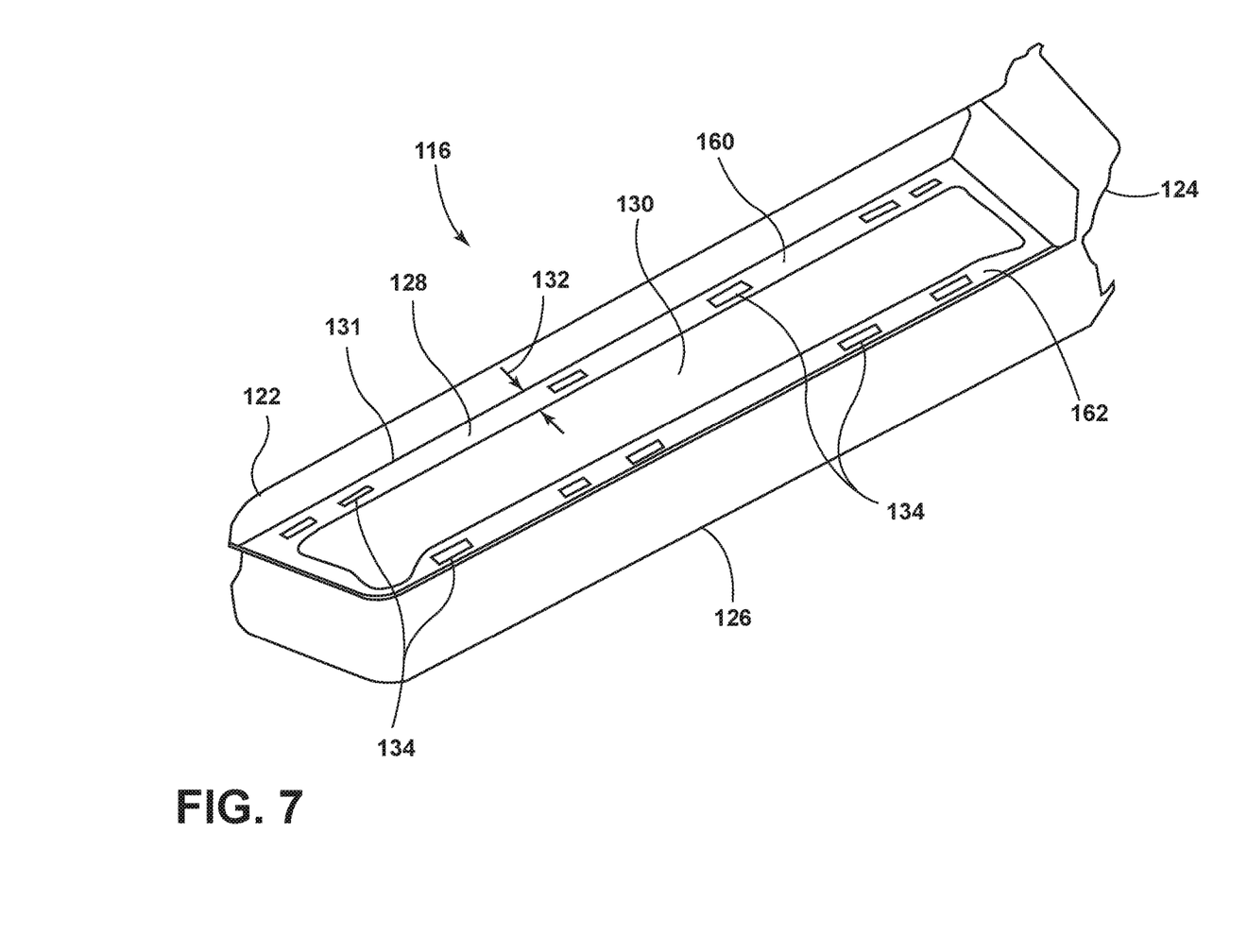
FIG. 7 is a perspective view of a base portion of a frame of the armrest of FIG. 6.
Figure 8:
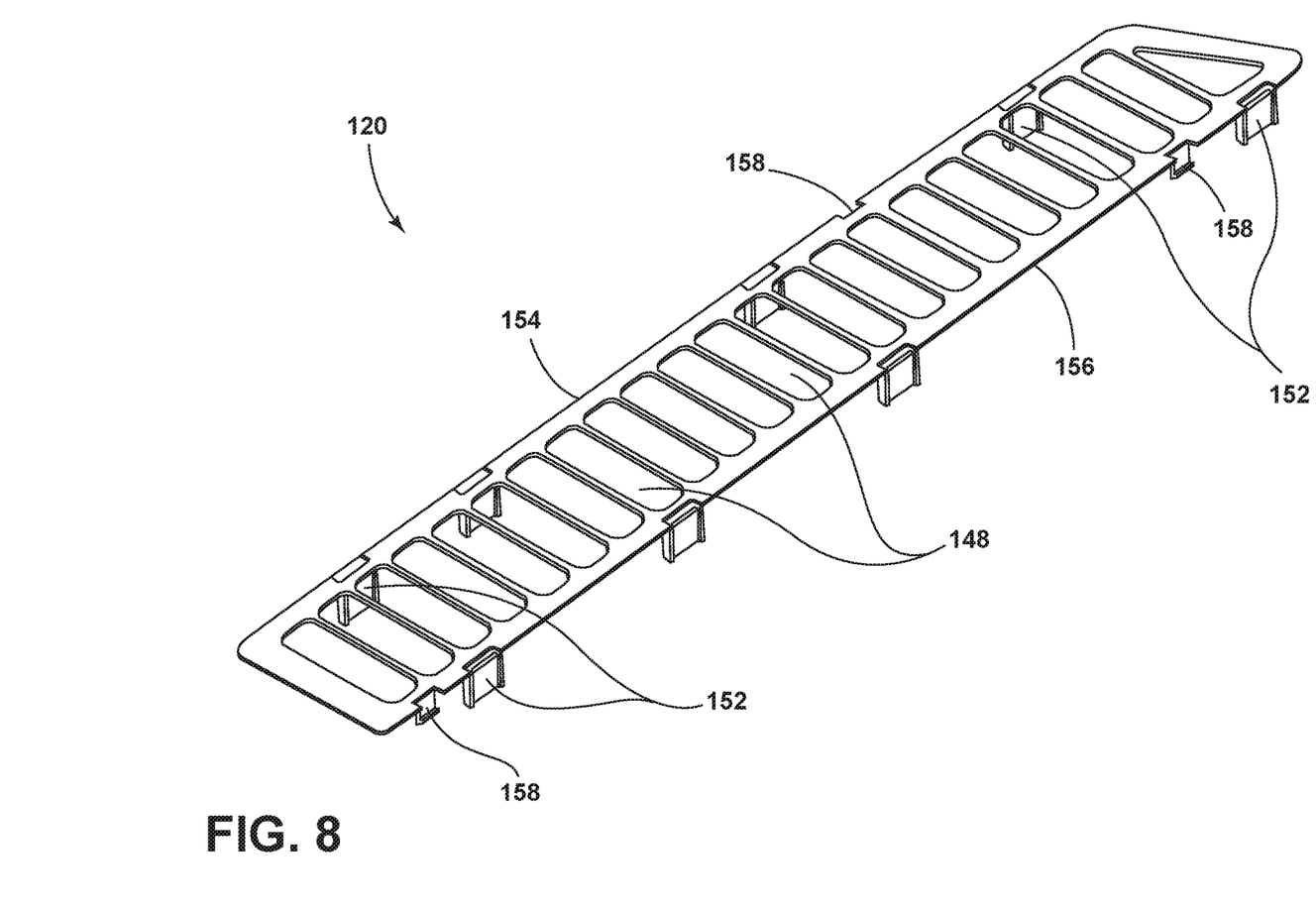
FIG. 8 is a perspective view of an arm portion of the frame of the armrest of FIG. 6.
Figure 9:
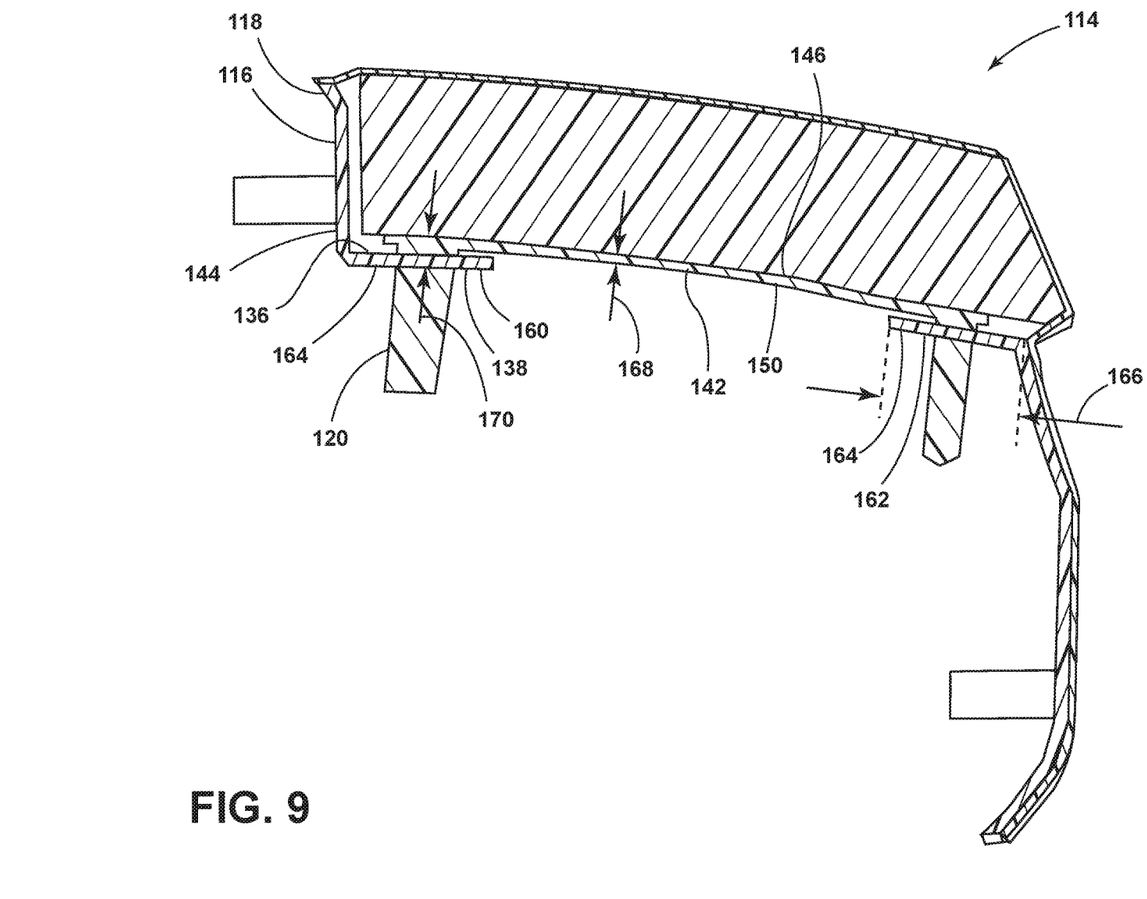
FIG. 9 is a cross-sectional view of the armrest of FIGS. 6-8 taken along line A-A of FIG. 2.

FIG. 6 is a perspective view of an armrest 114 with the cushion and cover layer removed in accordance with another embodiment of the instant disclosure. FIG. 7 is a perspective view of a base portion 116 of a frame 118 of the armrest 114 of FIG. 6. FIG. 8 is a perspective view of an arm portion 120 of the frame 118 of the armrest 114 of FIG. 6. FIG. 9 is a cross-sectional view of the armrest 114 taken along line A-A of FIG. 2. The armrest 114 of FIGS. 6-9 is similar to the armrests 18, 90 of FIGS. 3-5 and can be used as armrest 14 in the vehicle 12 of FIG. 1 as well. The armrest 114 includes the two-piece frame 118. The difference between the frame 118 and the frames 19, 92 will now be discussed in detail.

In the illustrated embodiment of FIGS. 6-9, the base portion 116 includes vertical portions 122, 124, 126 that are similar to the vertical portions described above with respect to the armrests 18, 90 of FIGS. 3-5. The frame 118 includes two pieces: the base portion 116 (FIG. 7) and the arm portion 120 (FIG. 8).

With reference to FIG. 7, the base portion 116 of the frame 118 includes a base frame 128 defining an opening 130. The vertical portions 122, 124, 126 of the base portion 116 extend from the base frame 128 (as described above in connection with the armrests 18, 90). The base frame 128 extends inwardly from an outer boundary 131 of the base portion 116 to define a width 132 of the base frame 128. The base frame 128 further includes a plurality of slots 134 extending from a top surface 136 of the base frame 128 to a bottom surface 138 of the base frame 128. Each slot 134 receives a tab 140 of the arm portion 120 to couple the base portion 116 and arm portion 120 of the frame 118 together.

With reference to FIG. 8, the arm portion 120 of the frame 118 defines a thinner pliable body 142 of a horizontal portion 144 of the frame 118. The arm portion 120 is an elongated sheet shaped generally as a rectangle or trapezoid. A top surface 146 of the arm portion 120 serves as a top, generally planar, surface 146 of the horizontal portion 144 and receives the vertical load. The arm portion 120 is disposed on top of the base frame 128 of the base portion 116. The arm portion 120 is sized to be contained within the outer boundary 131 of the horizontal portion 144. In the illustrated embodiment, the arm portion 120 is disposed horizontally adjacent the vertical portions 122, 124 of the base portion 116. The arm portion 120 may also include a plurality of apertures 148 extending from the top surface 146 to a bottom surface 150 of the arm portion 120 opposite the top surface 146 to increase collapsibility and decrease weight. Although the apertures 148 are illustrated as being generally rectangular, one of ordinary skill in the art will understand that the apertures 148 may take on variety of different shapes and sizes and discussed above. The arm portion 120 further includes a plurality of tabs 152 projecting downwards from lateral ends 154, 156 of the arm portion 120. Each tab 152 is inserted into a corresponding slot 134 of the base frame 128 to couple the arm portion 120 the base portion 116 together. Each tab 152 may be lightly fitted with flexibility to rotate inside the slots 134. The arm portion 120 further includes clips 158 projecting downwards from ends 154, 156 to be received into slots 134 of the base frame 128 for securing the arm portion 120 in places during assembly. The tabs 152 and clips 158 of the arm portion 120 extend downwards at a right angle relative to the top surface 146 of the arm portion 120.

In one embodiment, the base portion 116 comprises a thermoplastic polymer with a percent elongation (at break) less than 100%, and the arm portion 120 comprises a thermoplastic elastomer with a percent elongation (at break) greater than 100%. In one particular embodiment, the arm portion 120 comprises a thermoplastic polymer with a percent elongation (at break) greater than 300%. As discussed above, ABS can be used as the thermoplastic polymer for the base portion 116, and Hytrel® can be used as the thermoplastic elastomer for the arm portion 120. In another embodiment, the base portion 116 and arm portion 120 comprise the same material.

With reference to FIG. 9, the arm portion 120 defines the thinner pliable body 142 of the horizontal portion 144, and the lateral ends 154, 156 of the arm portion 120, together with lateral ends 160, 162 of the base frame 128, define thicker ends 164 of the horizontal portion 144. In one embodiment, the thicker ends 164 of the horizontal portion 144 bound the thinner pliable body 142 and have a width 166 of at least 10 mm. In some embodiments, a thickness 168 of the body 142 is 1-2 mm, and a thickness 170 of the ends 164 is 3-4 mm. In one embodiment, the thickness 168 is less than 2.5 mm, and the thickness 170 of the ends 164 is greater than 2.5 mm.

An armrest similar to the armrest 116 of FIGS. 6-9 was subjected to fatigue testing. The arm portion of the tested armrest was 1 mm thick and comprised Hytrel®. The apertures formed in the arm portion were circular and were disposed across the entire arm portion. A 220 N cyclic load was applied at a 5 second rate. After 114,000 cycles, the arm portion showed no visible signs of breaking or cracking.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure. Furthermore, details disclosed in connection with one embodiment apply to other disclosed embodiments as well, unless specified otherwise.

What is claimed is:

1. A vehicle armrest comprising:
   a unitary frame defining a horizontal portion having a thinner pliable body and a thicker stiffer perimeter surrounding the body, and first and second vertical portions extending in opposite directions from ends of the horizontal portion, the first vertical portion abutting an inner doorframe, and the horizontal and first vertical portions defining a cavity configured to retain a cushion over the body; and
   a cover layer over the cushion and frame.

2. The vehicle armrest of claim 1, wherein a top surface of the horizontal portion defined by the thinner pliable body and thicker stiffer perimeter forms a generally planar support surface extending between the first and second vertical portions, and wherein the cushion is disposed on the generally planar support surface.

3. The vehicle armrest of claim 1, wherein the thicker stiffer perimeter has a width of at least 10 mm measured from the thinner pliable body.

4. The vehicle armrest of claim 1, wherein the thinner pliable body includes a plurality of apertures extending therethrough.

5. The vehicle armrest of claim 1, wherein a first thickness of the thinner pliable body is less than 2.5 mm, and a second thickness of the thicker stiffer perimeter is greater than 2.5 mm.

6. The vehicle armrest of claim 1, wherein the thinner pliable body comprises a thermoplastic polymer with a percent elongation greater than 100%.

7. The vehicle armrest of claim 6, wherein the percent elongation of the thermoplastic polymer is greater than 300%.

8. A vehicle armrest comprising:
   a frame defining a horizontal portion having a thinner pliable body and first and second thicker ends bounding the body, and first and second vertical portions coupled to and extending in opposite directions from the horizontal portion, the first vertical portion abutting a doorframe, and the horizontal and first vertical portions defining a cavity for retaining a cushion over the body; and
   a cover layer over the cushion and frame.

9. The vehicle armrest of claim 8, wherein the frame further includes a base frame partially defining the first and second thicker ends of the horizontal portion, and wherein the first and second vertical portions extend from lateral sides of the base frame.

10. The vehicle armrest of claim 8, wherein the frame further includes a third vertical portion extending from a front side of the horizontal portion, and wherein the cavity is further defined by the third vertical portion.

11. The vehicle armrest of claim 8, wherein a top surface of the horizontal portion defined by the thinner pliable body and the first and second thicker ends forms a generally planar surface extending between the first and second vertical portions, and wherein the cushion is disposed on the generally planar surface.

12. The vehicle armrest of claim 8, wherein at least one of the first and second thicker ends has a width measured from the thinner pliable body of at least 10 mm.

13. The vehicle armrest of claim 8, wherein a first thickness of the thinner pliable body is less than 2 mm, and a second thickness of the first and second thicker ends is greater than 3 mm.

14. The vehicle armrest of claim 8, wherein the horizontal portion has a length, and wherein the first vertical portion extends the length of the horizontal portion.

15. A vehicle armrest comprising:
   a one-piece frame defining a horizontal portion with a generally planar top surface defined by a thinner body and a thicker perimeter bounding the body, and first and second vertical portions extending in opposite directions from opposing lateral ends of the horizontal portion, the first vertical portion abutting the top surface, and the horizontal and first vertical portions defining a cavity for retaining a cushion over the body and perimeter.

16. The vehicle armrest of claim 15, wherein the cushion is disposed on the generally planar top surface.

17. The vehicle armrest of claim 15, wherein the thinner body includes a plurality of apertures extending therethrough.

18. The vehicle armrest of claim 15, wherein a first thickness of the thinner body is less than 2 mm, and a second thickness of the thicker perimeter is greater than 3 mm.

19. The vehicle armrest of claim 15, wherein the one-piece frame further includes a third vertical portion extending from a front side of the horizontal portion, and wherein the cavity is further defined by the third vertical portion.

20. The vehicle armrest of claim 15, wherein the horizontal portion has a length, and wherein the first vertical portion extends the length of the horizontal portion.

* * * * *